United States Patent
Lu et al.

(10) Patent No.: US 6,670,411 B2
(45) Date of Patent: Dec. 30, 2003

(54) PROCESS FOR DEVOLATILIZING AN ACRYLIC RESIN AND PROCESS FOR PREPARING A POWDER COATING COMPOSITION

(75) Inventors: Szu-Ping Lu, Canton, MI (US); Paul J. Prucnal, Pittsburgh, PA (US)

(73) Assignee: Anderson Development Co., Adrian, MI (US)

( * ) Notice: Subject to any disclaimer, the term of this patent is extended or adjusted under 35 U.S.C. 154(b) by 0 days.

(21) Appl. No.: 09/968,858

(22) Filed: Oct. 3, 2001

(65) Prior Publication Data

US 2002/0068777 A1 Jun. 6, 2002

Related U.S. Application Data

(60) Provisional application No. 60/237,185, filed on Oct. 3, 2000.

(51) Int. Cl.⁷ .................. C08J 3/00; C08J 3/12
(52) U.S. Cl. ............... 523/340; 523/328; 524/87; 524/102; 524/285; 524/548; 528/480; 528/481; 528/492
(58) Field of Search ............... 524/87, 102, 285, 524/548; 523/328, 340; 525/327.3, 333.3, 333.6, 408, 375; 528/480, 481, 492

(56) References Cited

U.S. PATENT DOCUMENTS

| | | | |
|---|---|---|---|
| 5,066,698 A | * 11/1991 | Hazan et al. | ........... 524/268 |
| 5,212,245 A | 5/1993 | Franks et al. | |
| 5,523,349 A | 6/1996 | Shiomi et al. | |
| 5,547,757 A | 8/1996 | Swarup et al. | |
| 5,609,960 A | 3/1997 | Kasari et al. | |
| 5,648,117 A | 7/1997 | Shiomi et al. | |
| 5,663,240 A | 9/1997 | Simeone et al. | |
| 5,744,522 A | 4/1998 | Prucnal et al. | |
| 5,891,958 A | 4/1999 | Nambu et al. | |
| 6,008,301 A | 12/1999 | Miyawaki et al. | |
| 6,025,433 A | * 2/2000 | Shibatoh et al. | ........... 524/323 |
| 6,126,861 A | * 10/2000 | Bechtold | ........... 252/401 |
| 6,225,400 B1 | * 5/2001 | Bartol et al. | ........... 427/372.2 |
| 6,262,147 B1 | * 7/2001 | Ikushima et al. | ........... 522/15 |
| 6,297,314 B1 | * 10/2001 | Hintze-Bruning et al. | .. 524/100 |

OTHER PUBLICATIONS

Mar et al., "A New Class of Radical Scavengers for Coatings," Water–Borne and Higher Solids Coatings Symposium, Feb. 21–23, 1990, New Orleans, LA.

* cited by examiner

*Primary Examiner*—Judy M. Reddick
(74) *Attorney, Agent, or Firm*—Burns, Doane, Swecker & Mathis, LLP

(57) ABSTRACT

A process for separating a solvent and low molecular weight material from an acrylic resin by adding a hindered amine light stabilizer having at least one aminoether group to a mixture of the organic solvent, low molecular weight material and the acrylic resin and subjecting the resulting mixture to an elevated temperature for a time sufficient to remove the solvent and low molecular weight material from the acrylic resin by devolatilization. A composition can be provided which is capable of being formed into a powder coating composition which essentially contains an acrylic resin, a hindered amine light stabilizer having at least one aminoether group or residue thereof and less than 4% by weight of low molecular weight material having a molecular weight less than 600.

25 Claims, 1 Drawing Sheet

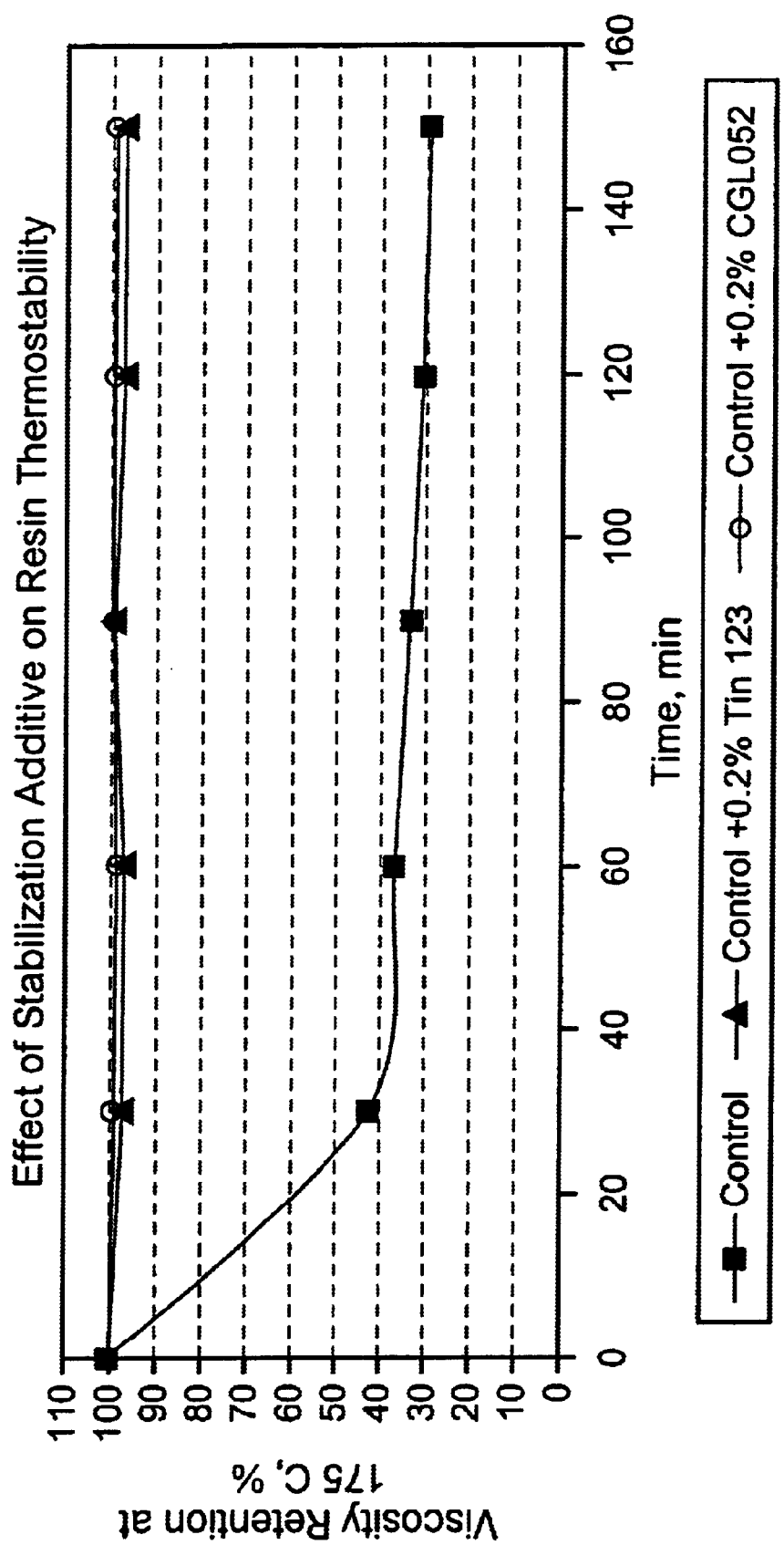

PROCESS FOR DEVOLATILIZING AN ACRYLIC RESIN AND PROCESS FOR PREPARING A POWDER COATING COMPOSITION

CROSS-REFERENCE TO RELATED APPLICATIONS

This application claims the benefit of provisional application Ser. No. 60/237,185 filed on Oct. 3, 2000, the contents of which are incorporated by reference.

BACKGROUND OF THE INVENTION

A. Field of the Invention

The present invention relates to a process for devolatilizing an acrylic resin in the presence of a hindered amine light stabilizer having at least one aminoether group. The present invention also relates to a process for preparing a powder coating composition which includes a step of devolatilizing an acrylic resin and a composition capable of being formed into a powder coating composition.

B. Description of the Related Art

In one typical preparation of acrylic resins, copolymerizable compounds, usually monomers, are mixed in an appropriate solvent, such as xylene, along with an initiator and reacted to form the acrylic polymer. The solvent and residual monomers are then separated from the acrylic resin at an elevated temperature and reduced pressure thereby leaving the acrylic resin by a technique referred to as devolatilization.

Although acrylic resins have a number of utilities, one valuable utility is in the field of coatings, particularly powdered coatings, wherein the acrylic resin is melt blended with other coating components and additives, such as light stabilizers, which improve the characteristics of the coating. The blend is permitted to cool and is then formed into a powder that can be applied to various surfaces such as automotive parts and bodies.

One of the problems encountered with the devolatilization procedure is that the conditions under which the solvent and residual monomers are separated from the acrylic resin causes the acrylic polymer chain to degrade thereby forming monomers and low molecular weight oligomers. This phenomenon in turn causes a lower yield of the desired resin and batch to batch variations in the properties of the resin. Furthermore, the presence of monomers and oligomers function as plasticizing agents that can affect the processing characteristics of the resin and can lead to deficiencies, such as microporosity and yellowing, in coatings made therefrom.

Illustrative of the art relating to acrylic resins that are prepared and used in powder coatings is U.S. Pat. No. 5,663,240 which describes the preparation of a powder coating of an epoxy-functional acrylic copolymer and carboxylic acid. As set forth in the patent, an illustrative epoxy-functional acrylic copolymer (Polymer Example A) is prepared in a xylene solvent and subjected to devolatilization by vacuum distillation over a four hour period during which time the temperature of the batch increased to 356° F. (180° C.). In order to form the powder coating composition, the copolymer is blended with other components, including flow control additive, air release agent and ultraviolet light stabilizer, in a Henschel Blade Blender, extruded at an elevated temperature, a catalyst is added, the mixture is then further blended, extruded again, hammer milled and classified.

Additional powder coating compositions that are blended with various additives including light stabilizers are described in U.S. Pat. Nos. 5,212,245, 5,523,349 and 5,648,117 (divisional of the '349 patent). A low gloss powder coating composition which also includes various additives including light stabilizers is set forth in U.S. Pat. No. 5,744,522 which also includes a background discussion of various other powder coating documents. A further patent relating to a powder paint composition is U.S. Pat. No. 6,008,301, which includes a discussion of documents relating to powder coating technology in the background section of the patent.

When coating articles such as automobile bodies and parts, it is often in order to use multiple coating layers with the top layer being referred to as a clear coat. Polymeric compositions are also used for the top layer and such compositions can include a variety of additives including light stabilizers. Illustrative patents which disclose polymeric compositions for a top coating layer are U.S. Pat. Nos. 5,547,757, 5,609,960 and 5,891,958.

BRIEF SUMMARY OF THE INVENTION

In one aspect, the present invention provides a process for separating a solvent and low molecular weight material from an acrylic resin. The method involves adding a hindered amine light stabilizer having at least one aminoether group to a mixture of the organic solvent, the acrylic resin and the low molecular weight material and subjecting the resulting mixture to an elevated temperature for a time sufficient to remove the organic solvent and the low molecular weight material from the acrylic resin by devolatilization.

In a further aspect, the present invention provides a process for forming a powder coating composition. The method involves adding a hindered amine light stabilizer having at least one aminoether group to a mixture comprised of an organic solvent, low molecular weight material and an acrylic resin and subjecting the resulting mixture to an elevated temperature for a time sufficient to remove the organic solvent and low molecular weight material from the acrylic resin by devolatilization, blending the acrylic resin with components so as to form a composition suitable for coating a surface and forming the composition into a powder coating composition.

In a still further aspect, the present invention provides a composition capable of being formed into a powder coating composition which consists essentially of an acrylic resin, a hindered amine light stabilizer having at least one aminoether group or residue thereof and less than 4% by weight of low molecular weight material having a molecular weight less than 600.

BRIEF DESCRIPTION OF THE DRAWINGS

FIG. 1 is a graph illustrating the relatively small change in melt viscosity that can be attained in accordance with two illustrative embodiments of the present invention compared to a control example.

DETAILED DESCRIPTION OF THE INVENTION

As noted above, one aspect of the present invention relates to a process for separating a solvent and low molecular weight material from an acrylic resin using devolatilization. The acrylic resin used in the present invention is prepared from one or more acrylic monomers of the formula $CH_2=CR_1C(O)OR_2$ wherein $R_1$ is selected from the group consisting of H and an alkyl group containing from 1 to 4 carbon atoms and $R_2$ is selected from the group consisting of H, an alkyl group containing from 1 to 24 carbon atoms, a hydroxy-substituted alkyl group containing 1 to 4 carbon atoms, and an oxirane-containing monomer having the structure $R_3CR_4(O)CH_2$ wherein $R_3$ represents a branched or unbranched alkyl group containing 1 to 20 carbon atoms and $R_4$ represents H or $CH_3$. Mixtures of monomers can be used in which case different R groups can be present. Illustrative monomers include acrylic acid, methacrylic acid, acrylate esters, methacrylate esters, glycidyl acrylate, glycidyl methacrylate, β-methyl glycidylacrylate, β-methyl glycidylmethacrylate, 1,2-epoxybutylacrylate, cyclohexylmethacrylate, laurylmethacrylate, stearylmethacrylate, 2-ethylhexylmethacrylate, hydroxy polycaprolactone acrylate (available from Union Carbide) and mixtures thereof. Preferred monomers include methyl methacrylate, n-butyl methacrylate and glycidyl methacrylate.

The acrylic resin may also be formed from ethylenically unsaturated compounds that will copolymerize with the acrylic monomers. For instance, various vinyl compounds, such as N-vinylpyrrolidone, vinyl acetate, vinyl neodecanoate, can be used in a manner known to those skilled in the art. One preferred type of vinyl compound are styrenic compounds, such as styrene, alpha-methylstyrene, vinyltoluene, 4-acetoxystyrene, with the preferred styrenic compound being styrene. When present, the vinyl compounds are typically added in an amount of from about 1 to about 50% by weight, preferably from about 5 to about 35% by weight relative to the total amount of monomers used to prepare the acrylic resin. Other monomers which are known to be useful in the preparation of acrylic resins are set forth in the U.S. patents discussed above, the contents of which are incorporated by reference.

The process for preparing the acrylic resin is in accordance with techniques well known in the art. Typically, a solvent is provided in an enclosed reactor that is selected so that the atmosphere above the reaction mixture and the temperature of the reaction mixture can be controlled and the reaction mixture can be stirred. The solvent is selected so that the monomers can be dissolved therein and will not react with the monomers or degrade under the reaction conditions. Typically, an organic solvent is used, such as xylene, toluene and other homologous aromatic solvents, alkyl and alkoxy acetate solvents, such as n-amylacetate, n-butyl acetate, 2-methoxyethylacetate, 2-ethoxyethylacetate and mixtures thereof. A preferred solvent is xylene in view of factors such as cost and ease of separation from the formed acrylic resin by devolatilization. The amount of solvent is not critical, but is usually selected so that it provides an efficient reaction medium, but is not so large that substantial energy and time is necessary to separate the solvent from the acrylic resin by devolatilization. Generally, the amount of solvent is selected so that the total weight of monomers is from about 30 to about 90% by weight of the total reaction mixture, more preferably from about 50 to about 70% by weight of the total reaction mixture.

Air is removed from the reactor and the solvent such as by repeated flushing with nitrogen while stirring the solvent. The solvent is then heated to the reaction temperature, after which a mixture of the reactants (typically monomers) used to form the acrylic resin is then introduced into the reactor over a period of time from about one to ten hours. A temperature of from about 100 to about 160° C. is employed depending on the initiator used. The initiators used are generally well known in the art. Typical initiators include peroxides such as t-butylperoctoate, benzoyl peroxide and di-t-butyl peroxide, or diazo compounds such as azobisisobutyronitrile. The initiator can be added to the pre-mixed monomers or added separately to the reactor. The amount of initiator is selected based on the desired molecular weight. In general, the addition of a greater amount of initiator creates more polymer chains and therefore lower molecular weight. Typically, the amount of initiator is from about 0.3 to about 10% by weight of the monomers, preferably from about 1 to about 7% by weight.

The reaction is generally conducted for from about 3 to about 7 hours at a temperature of from about 100 to about 160° C. to form an acrylic resin which typically has a weight average molecular weight of from about 3,000 to about 20,000, preferably from about 3,000 to about 12,000. In order to improve conversion, a further amount of initiator (typically on the order of less than about 1% based on the weight of the monomers) can be added at the end of the polymerization step. Despite this subsequent addition of initiator, a small amount of unpolymerized monomers remains along with oligomers of the monomers which constitute a low molecular weight material.

The acrylic polymer is then separated from the solvent by devolatilization which also serves to remove the low molecular weight material, particularly the residual monomers. The conditions of devolatilization are not crucial, but are usually selected to attain efficient separation of the acrylic resin from the solvent. General conditions for devolatilization are at a temperature of from about 100 to about 180° C., preferably from about 165 to about 170° C. for from about 4 to about 5 hours at a reduced pressure of from about 1 to about 20 mm Hg. At lower pressures of from about 1 to about 10 mm Hg, the temperature can be lowered with temperatures of from about 150 to about 160° C. being particularly effective. A typical devolatilization procedure involves heating the polymer reaction mixture to the boiling point at atmospheric pressure and distilling a major part of the solvent. At some point, vacuum is applied to maintain a good rate of distillation. When maximum vacuum (typically from 5 to 15 mm Hg) is attained, the resin is held for a period of from about 1 to about 2 hours at a temperature of from about 150 to about 175° C. By the devolatilization procedure, the acrylic resin has a residual monomer content of less than about 1% by weight, preferably less than about 0.5% by weight.

One of the challenges presented by the devolatilization procedure is that the conditions used are at or near the ceiling temperature of the acrylic resin at which depolymerization begins to occur. Since depolymerization occurs largely at the terminal end of the polymer chain, free monomers or their oligomerization products result which provide low molecular weight material mixed with the organic solvent and the acrylic resin. Depending on the particular resin and the shear stress applied to the molten polymer, the ceiling temperature for acrylic resins can be as low as 150° C. Accordingly, while the devolatilization procedure is occurring and the solvent and residual monomers are being removed from the acrylic resin, the conditions of devolatilization actually create further monomers (which can form oligomers) that defeat the purpose of devolatilization and can adversely affect the properties of the resin. The monomers and their oligomerization products are effective plasticizers for the resin and can effect processability of the resin in the powder making process, as well as the physical stability of the powder coating itself. Also, the monomers and oligomers can interact with other components of the powder coating to cause yellowing or affect cured coating properties due to low functionality or no functionality. Furthermore, since the oligomers are much less volatile than the typical monomers, once formed, they are difficult to remove. Accordingly, it is highly advantageous to prevent their formation. This depolymerization can also cause inconsistent properties from one batch of resin to another. This can be particularly troublesome for glycidyl monomers, such as glycidyl methacrylate, which are less volatile than other monomers and therefore are not as readily removed by the devolatilization procedure.

Once the devolatilization procedure is completed, it is often necessary to maintain the resin in the molten state while additional processing, such as the preparation of resin into crushed form (typically having an average particle size of from about 0.1 to 10 mm), is conducted. During this time, further depolymerization can occur.

In order to prepare a coating composition from the acrylic resin, any well known technique may be used. For instance, the crushed resin can be charged into a pre-mixer along with a curing agent, hindered amine stabilizer, ultraviolet absorber, benzoin (for degassing), flow control agents, cure catalysts, etc. Depending on the composition, the acrylic resin typically composes from about 60 to about 80% by weight of the composition. Mixing is conducted at high shear in order to attain as homogeneous a mixture as possible. The mixture is fed to an extruder where it is melted, mixed and extruded. Typically, the conditions in the extruder are below the ceiling temperature (e.g., about 100–130° C.) so that little additional depolymerization occurs.

The extruded material is discharged on a chill roll and the solidified composition is subjected to grinding and classifying so that the powdered coating material has a particle size range of from about 5 to about 125 $\mu$m with the average particle size being in the range of from about 35 to about 70 $\mu$m. The powdered coating composition can then be applied to a variety of surfaces, melted and cured to form a hard, weather-resistant coating according to well known techniques. One of the problems which has been encountered when an acrylic resin having a high content of residual monomer is used is that the plasticizing effect causes the extruded coating composition to adhere to the chill roll which adversely affects the efficiency of the process and can reduce yield of the powdered coating composition. In addition, the presence of a high residual monomer content can adversely affect the color of the composition, particularly where the powdered coating composition is designed to form a clearcoat applied over a waterborne basecoat.

Referring to the depolymerization phenomenon with greater particularity, it has been found that in the formation of the acrylic resin that the C—C bond energy in the backbone adjacent to the terminal radical site drops 15–40 kcal/mol. Thus, a radical site on the end of the acrylic resin leads to progressive depolymerization with the generation of monomers during the devolatilization procedure. This mechanism of depolymerization for an acrylic copolymer wherein R1 and R2 are the same or different can be illustrated as the following scheme:

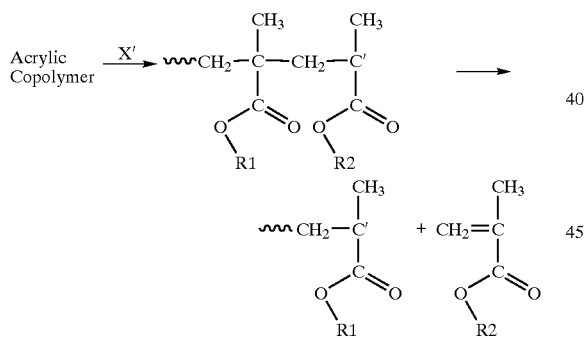

Since most acrylic resins for powder coatings are produced by free radical solution polymerization. The combination of high temperature, vacuum, and mechanical shear force during the devolatilization procedure deteriorates the resin products according to the mechanism of depolymerization shown above. The use of vacuum conditions, elevated temperature and high shear stirring to remove the solvent (and monomers) actually increases the rate of depolymerization.

The present invention addresses the substantial challenge in the art encountered due to depolymerization and in one aspect provides a process for separating a solvent and low molecular weight material from an acrylic resin comprising adding a hindered amine light stabilizer having at least one aminoether group to a mixture of the organic solvent and the acrylic resin and subjecting the resulting mixture to an elevated temperature for a time sufficient to remove the solvent from the acrylic resin by devolatilization.

Hindered amine light stabilizers having at least one aminoether group used in the present invention are known in the art or can be readily prepared. Hindered amine light stabilizers themselves are extremely well known in the art and are commonly referred to as "HALS" that are available from a number of commercial sources such as Ciba Specialty Chemicals, Inc., Clariant Corporation, Cytec Inc and Ferro Corporation. In this respect, it is to be understood that in the context of the present invention, these compounds do not function as a "light stabilizer", but this terminology is being used herein so that those of ordinary skill in the art will understand the type of compounds that are being used. It is also to be understood that most HALS do not contain an aminoether group. While such HALS without an aminoether group are known to be effective in stabilizing various compositions, including powder coating compositions, it has been found that they provide inferior results when used in the devolatilization procedure compared to the compounds of the present invention. One hindered amine light stabilizer with two aminoether groups that can be used in the present invention is TINUVIN® 123 which is commercially available from Ciba Specialty Chemicals, Inc. and which is reported to have the following chemical structure:

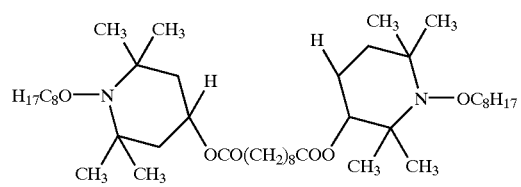

A further hindered amine light stabilizer with two aminoether groups that can be used in the present invention is a material commercially available from Ciba Specialty Chemicals, Inc. under the designation CGL-052 and which is reported to have the following chemical structure wherein the free lines indicate methyl groups:

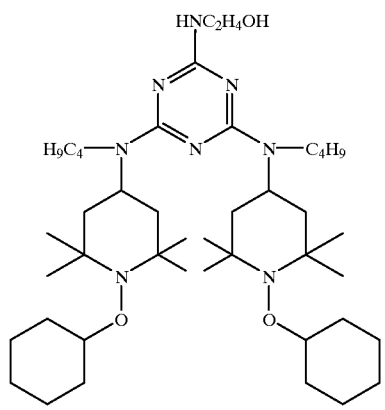

The hindered amine light stabilizer with an aminoether group can be prepared from hindered amine light stabilizers without an aminoether group, but having an amine group available for reaction with an activating compound such as a peracid exemplified by 3-chloroperoxybenzoic acid, peroxybenzoic acid and mixtures thereof. The reaction of the peracid with the hindered amine can be conducted by mixing the hindered amine with 1% by weight of the peracid on a hot plate at 100° C. in a manner generally understood by those of ordinary skill in the art. After cooling, the mixture is ground into powder. One illustration of this procedure is the reaction of TINUVIN® 770 with 1% by weight of 3-chloroperoxybenzoic acid to form a hindered amine light stabilizer having an aminoether group. TINUVIN® 770 has the following chemical structure:

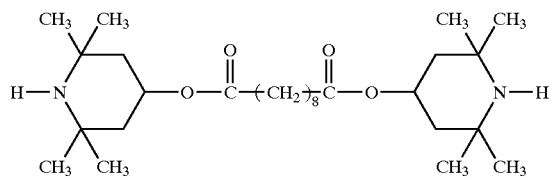

The hindered amine light stabilizer having at least one aminoether group is typically added at the conclusion of the polymerization procedure and prior to the devolatilization procedure in order to be most effective. The amount added generally ranges from about 500 to about 10,000 ppm, preferably from about 1,000 to about 2,000 ppm based on the total amount of solids to be recovered from the devolatilization procedure. It will be apparent that mixtures of the hindered amine light stabilizer having at least one aminoether group can be used. It is not necessary to remove the hindered amine light stabilizer having at least one aminoether group upon completion of the devolatilization procedure since hindered amine light stabilizers are often added when a coating composition is prepared. Accordingly, the resin from the devolatilization procedure provides a composition that is capable of being formed into a powder coating composition that consists essentially of the acrylic resin, a hindered amine light stabilizer having at least one amino group or residue thereof and less than 4% by weight, preferably less than 3% by weight, most preferably less than 2.5% by weight of low molecular weight material having a molecular weight less than 600 as determined by gel permeation chromatography. The presence of such low amounts of low molecular weight material is particularly advantageous for acrylic resins having a weight average molecular weight of from about 3,000 to about 12,000. As used herein, the term "consists essentially of" is used to indicate that the composition does not contain all the components necessary for a powder coating composition.

The presence of the hindered amine light stabilizer having at least one aminoether group serves to prevent or significantly reduce the depolymerization of the polymer chain during the devolatilization procedure. It is believed that conventional hindered amine light stabilizers need to be activated by light and oxygen as part of the Denisov cycle before they can provide a stabilizing function. However, the Denisov cycle also provides dialkyl peroxides when reacted with a free radical created by depolymerization which in turn can form additional radicals that propagate the reaction. In contrast, the hindered amine light stabilizer having at least one aminoether group generates an alcohol and a carbonyl-containing compound which do not propagate further radicals. In addition, since the hindered amine light stabilizer having at least one aminoether group has a lower basicity, the tendency to yellow can be reduced. In this way, the invention can achieve substantial improvements in yield, uniformity of product within the same batch, batch-to-batch variations and free residual monomer content which in turn can result in improved powder coating properties, such as increased physical stability of the powder and reduced yellowing in coatings made therefrom. As a still further advantage, the hindered amine light stabilizer having at least one aminoether group can provide process flexibility by permitting the use of higher boiling point solvents in the polymerization process. Such higher boiling point solvents would require higher devolatilization temperatures (or higher vacuum than would be practical in an industrial process). Thus, in accordance with the present invention, the devolatilization temperature can be from about 100° to about 200° C., preferably from about 145° to about 200° C.

The following Examples illustrate various aspects of the present invention. It is to be understood that the present invention is defined by the appended claims and not the specific details of the Examples.

CONTROL EXAMPLE 1 AND EXAMPLE 1

To illustrate the effect of the present invention in the preparation of an acrylic resin, a two gallon stainless steel reactor provided with a stirrer and a nitrogen flushing apparatus is initially loaded with 1830 g of xylene. The xylene is heated to about 139° C. while being stirred and the reactor being flushed with nitrogen. Over about 5 hours, a mixture containing 240 g of styrene, 1170 g of methyl methacrylate, 120 g of isobutyl acrylate, 30 grams of isobutyl methacrylate, 1380 g of glycidyl methacrylate and 216 g of tert-butylperoctoate (as initiator) is added to the reactor. A further 100 g of xylene is then used to rinse the lines of the added mixture. Thereafter, the temperature of the reactor is reduced to about 130° C., 60 g of styrene is added over 10 minutes and 10 minutes after the styrene addition is completed, a mixture of 60 g of xylene and 15 g of tert-butylperoctoate is added over 2 hours followed by a rinse with 10 g of xylene whereupon the temperature is reduced to 100° C. The contents of the reactor are stirred at all times.

The reaction mixture is then subjected to a devolatilization procedure that is conducted at 160° C. and 1 mm Hg for 1 hour. In the Control Example, the procedure is conducted without the presence of a hindered amine light stabilizer having at least aminoether group. In Example 1, 0.5% by weight of Tinuvin® 123 (based on the weight of solid resin) is added prior to the devolatilization procedure. The resin is placed on the hot stage of an ICI Cone & Plate Viscometer for 3 hours with viscosity measurements taken every 0.5 hour (in poise). Table 1 provides the results which illustrate that Control Example 1 does not provide a stable material as demonstrated by the substantial decrease in melt viscosity while Example 1 provides a stable material.

TABLE 1

| Time   | Control Example 1 | Example 1 |
|--------|-------------------|-----------|
| 0 hr   | 25.0 P            | 24.3 P    |
| 0.5 hr | —                 | 23.8 P    |
| 1.0 hr | 23.0 P            | 23.8 P    |
| 2.0 hr | 20.8 P            | 24.3 P    |
| 3.0 hr | 20.5 P            | 24.5 P    |

CONTROL EXAMPLE 2 AND EXAMPLES 2 AND 3

To a two gallon Parr reactor Is charged 1830 g of xylene that is stirred at 200 rpm. Air is eliminated by consecutively pressurizing and depressurizing the reactor to 60 psig with dry nitrogen four times. The mixture is heated to 139° C. after which a mixture of 150 g of styrene, 1350 g of methyl methacrylate, 300 g of n-butylacrylate, 1,200 g of glycidylmethacrylate, and 207 g of tert-butylperoctoate are pumped into the reactor over 5 hours at 139° C. The charging pump and lines are rinsed with 100 g of xylene and the acrylic resin solution is allowed to cool to 130° C. over 15 minutes. A mixture of 60 g xylene and 15 g of tert-butylperoctoate are added over two hours as the temperature fell from 130° C. to 100° C. The pump and lines are rinsed with 10 g of xylene and the acrylic resin solution is held for an additional 30 minutes at 100° C.

The acrylic resin solution is discharged from the Parr reactor and divided into two parts for the devolatilization (stripping) procedure.

Control Example 2: Into a five liter flask fitted for distillation, 1730 g of the acrylic resin solution is added in and most of the xylene is distilled at one atmosphere. Vacuum is then applied while bringing the temperature up to 160° C. The molten material is stirred for 60 minutes at 160°±1° C. and 2 mm Hg and then poured into an aluminum pan to give a friable resin.

Example 2: Into 1730 g of the acrylic resin solution, 2 g of Tinuvin® 123 is added in a five liter flask fitted for distillation and most of the xylene is distilled at one atmosphere. Vacuum is then applied while bringing the temperature up to 160° C. The molten material is stirred for 60 minutes at 160°±1° C. and 2 mm Hg and then poured into an aluminum pan to give a friable resin.

Example 3: The procedure of Example 2 is repeated except that into 1730 g of the acrylic resin prepared as in Control Example 2, 2 g of CGL-052 powder is added in a five liter flask fitted for distillation and most of the xylene is distilled at one atmosphere. Vacuum is then applied while bringing the temperature up to 160° C. The molten material is stirred for 60 minutes at 160°±1° C. and 2 mm Hg and then poured into an aluminum pan to give a friable resin.

The acrylic resin from each Example is then aged for 2.5 hours at 175° C. with weight loss determined at the end of the first hour and the melt viscosity of samples determined at the beginning and after every 0.5 hour. The results of the weight loss, melt viscosity and other tests are summarized in Table 2. In addition, a sample of devolatilized resin from Control Example 2 and further samples to which 0.2% by weight of Tinuvin® 123 and CGL-052 are added are tested for viscosity retention by being placed on an ICI Cone & Plate Viscometer (setting at 175° C.) with the viscosity being recorded every 30 minutes. The results are shown graphically in FIG. 1.

TABLE 2

|  | Control Example 2 | Example 2 | Example 3 |
| --- | --- | --- | --- |
| Additive for Stabilization | — | 0.2% Tinuvin 123 | 0.2% CGL-052 |
| Devolatilization Cond. | 160° C./1.5 mmHg/ 1 Hr | 160° C./2 mmHg/ 1 Hr | 160° C./2 mmHg/ 1 Hr |
| Yield[1] | 89.5% | 92.5% | 91.0% |
| Resin Melt Viscosity[2] (@ 150° C., poise) | 139 | 248 | 188 |
| EEQ[3] | 377 | 383 | 383 |
| Residual Monomers | MMA = 3286 ppm Sty. = 0 ppm BMA = 1706 ppm GMA = 9949 ppm | MMA = 260 ppm Sty. = 0 ppm BMA = 125 ppm GMA = 1882 ppm | MMA = 376 ppm Sty. = 0 ppm BMA = 476 ppm GMA = 5466 ppm |
| Tg (DSC) | 42.0° C. | 46.2° C. | 46.9° C. |
| MW[4] | Mp = 5346 Mw = 5127 HMWP = 0.38% LMWP = 4.52% | Mp = 5377 Mw = 5308 HMWP = 0.40% LMWP = 2.32% | Mp = 5255 Mw = 5277 HMWP = 0.38% LMWP = 2.10% |
| Gel-time[5] | 220 sec | 212 sec | 217 sec |
| MV Stability[6] (@ 175° C.) | Not Stable | Stable | Relatively Stable |
| Weight Loss[7] @ 175° C. × 1 hr | 17.5% | 0% | 1.31% |
| Cured Test Specimen dB[8] | 22.7 | 18.5 | 22.4 |

[1]

$$Yield = \frac{Weight\ of\ solid\ product\ recovered\ from\ stripping}{Polymer\ syrup\ used\ for\ stripping \times Syrup\ \%\ solids} \times 100\%$$

[2]Melt Viscosity: was measured by ICI Cone & Plate Viscometer (VR4752 with VR4140 cone) setting at 150° C.
[3]EEQ: was measured by Mettler Autotitrator DL25
[4]MW: was measured by GPC (gel permeation chromatography), HMWP (high MW portion) was defined as % of Mw greater than 20,000, and LMWP (low MW portion) was defined as % of Mw lower than 600.
[5]Gel-time: the resin was ground with 1,12-dodecanedioic acid curing agent (at epoxy/ COOH = 1/1 ratio), and measured the time it took when powder melt viscosity reached 400 poise on 150° C. ICI Cone & Plate Viscometer.
[6]MV Stability: Put the resin on ICI Cone & Plate Viscometer (setting at 175° C.) and read the viscosity every 30 minutes to see if the viscosity is stable or not. If the polymer decomposes, the viscosity should decrease during aging.
[7]Weight Loss: Using 1 g resin sample, measure the % weight loss after storing the sample in 175° C. oven for one hour.
[8]Cured Test Specimen dB: Grind the resin with dodecyl diamine curing agent, ultra-violet absorba, hindered amic light stabilizer, and Benzoin. This formulated powder was cast in a TEFLON mold on 160° C. hot plate for 40 minutes to make a 1.7 mm thickness and 17 mm diameter chip. The color of the chip (dB) was measured by X-Rite SP78 Spectrophotometer.

The melt viscosity stability test result for CGL-052 in Table 2 indicates that while it provides improved stability compared to the Control Example, it is not as efficient as Tinuvin® 123. However, comparable stability might be attained by using a slightly greater amount of additive of the CGL-052.

CONTROL EXAMPLE 3, COMPARATIVE EXAMPLES 1–3 AND EXAMPLES 4–5

The procedure of Control Example 2 and Examples 2 and 3 is again essentially repeated except that the mixture added to the reactor contains 50 g of styrene, 449 g of methyl methacrylate, 101 g of n-butyl methacrylate, 400 g of glycidyl methacrylate and 70 g of tert-butylperoctoate (as initiator). In addition, after the completion of the monomer/initiator mixture, the reaction mixture is held for one hour while conducting reflux, cooled to 100° C. whereupon a further 2 g of tert-butylperoctoate is added and after a further one hour an additional 3 g of tert-butylperoctoate is added and the reaction mixture held for one hour to provide 1742 g of an acrylic resin material containing 1075 g of solids (non-volatiles of 61.7% by weight). Devolatilization is conducted for one hour at 180° C. at 10 mm Hg. The acrylic resin is then aged for 2 hours at 175° C. with the melt viscosity of samples taken at the beginning and after every 0.5 hour. For Control Example 3, no material is added. For Comparative Example 1, 0.2% by weight of Tinuvin® 144 (which contains both a hindered amine light stabilizer, but without an aminoether group, and a hindered phenolic antioxidant moiety) is added. For Comparative Example 2, 0.2% by weight of Tinuvin® 770 (hindered amine light stabilizer, but without an aminoether group) is added. For Comparative Example 3, 0.2% by weight of Irganox® 1010 (which is a hindered phenolic antioxidant) is added. For Example 4, 0.2% by weight of Tinuvin® 123 is added. For Example 5, 0.2% by weight of Tinuvin® 770 that has been reacted with 0.02% by weight of 3-chloroperoxybenzoic acid whereby an aminoether group is formed. The decrease in the melt viscosity relative to the original melt viscosity for each of the Examples is set forth in Table 3.

TABLE 3

| Minutes | Control Example 3 | Comparative Example 1 | Comparative Example 2 | Comparative Example 3 | Example 4 | Example 5 |
| --- | --- | --- | --- | --- | --- | --- |
| 0 | 100.0% | 100.0% | 100.0% | 100.0% | 100.0% | 100.0% |
| 30 | 81.7% | 94.9% | 87.0% | 98.3% | 98.9% | 100.0% |
| 60 | 70.8% | 91.5% | 84.3% | 97.5% | 98.9% | 98.2% |
| 90 | 66.7% | 89.8% | 82.6% | 94.9% | 98.4% | 98.2% |
| 120 | 65.0% | 89.0% | 82.8% | 93.2% | 98.4% | 97.3% |

Although the present invention has been described with reference to certain preferred embodiments, it is apparent that modifications and variations thereof may be made by those skilled in the art without departing from the scope of the invention as defined by the following claims.

What is claimed is:

1. A process for separating a solvent and low molecular weight material from an acrylic resin reaction mixture comprising adding a hindered amine light stabilizer having at least one aminoether group to the reaction mixture of the organic solvent, low molecular weight material comprised of monomer material from which the acrylic resin is formed and the acrylic resin and subjecting the resulting mixture to an elevated temperature for a time sufficient to remove the organic solvent and low molecular weight material from the acrylic resin by devolatilization.

2. The process of claim 1 wherein the mixture is devolatilized at a temperature of from about 100° to about 200° C.

3. The process of claim 1 wherein the mixture is devolatilized at a temperature of from about 145° to about 200° C.

4. The process of claim 1 wherein the hindered amine light stabilizer having at least one aminoether group is added to the acrylic resin reaction mixture in an amount of from about 500 to about 10,000 ppm.

5. The process of claim 1 wherein the hindered amine light stabilizer having at least one aminoether group is added to the acrylic resin reaction mixture in an amount of from about 1,000 to about 2,000 ppm.

6. The process of claim 1 wherein the hindered amine light stabilizer has two aminoether groups.

7. The process of claim 6 wherein the hindered amine light stabilizer has the following chemical structure:

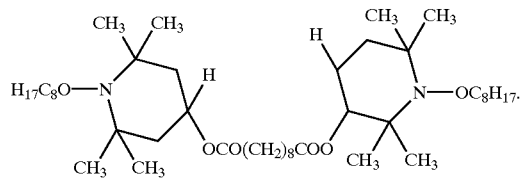

8. The process of claim 1 wherein the hindered amine light stabilizer is prepared by reacting a hindered amine light stabilizer that does not contain an aminoether group with a peracid so as to provide the hindered amine light stabilizer with at least one aminoether group.

9. The process of claim 1 wherein the acrylic resin is prepared from monomers comprised of at least one glycidyl compound.

10. The process of claim 9 wherein the glycidyl compound is selected from the group consisting of glycidyl acrylate, glycidyl methacrylate and mixtures thereof.

11. The process of claim 1 wherein the acrylic resin is prepared from monomers comprised of at least one styrene compound.

12. The process of claim 11 wherein the styrene compound is styrene.

13. A process for forming a powder coating composition comprising adding a hindered amine light stabilizer having at least one aminoether group to a mixture comprised of an organic solvent, an acrylic resin and low molecular weight material comprised of monomer material from which the acrylic resin is formed and subjecting the resulting mixture to an elevated temperature for a time sufficient to remove the organic solvent and low molecular weight material from the acrylic resin by devolatilization, blending the acrylic resin with components so as to form a powder coating composition.

14. The process of claim 13 wherein the mixture is devolatilized at a temperature of from about 100° to about 200° C.

15. The process of claim 13 wherein the mixture is devolatilized at a temperature of from about 145° to about 200° C.

16. The process of claim 13 wherein the hindered amine light stabilizer having at least one aminoether group is added to the acrylic resin mixture in an amount of from about 500 to about 10,000 ppm.

17. The process of claim 13 wherein the hindered amine light stabilizer having at least one aminoether group is added to the acrylic resin mixture in an amount of from about 1,000 to about 2,000 ppm.

18. The process of claim 13 wherein the hindered amine light stabilizer has two aminoether groups.

19. The process of claim 18 wherein the hindered amine light stabilizer has the following chemical structure:

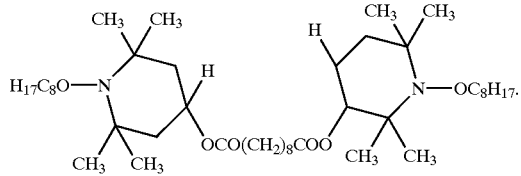

20. The process of claim 13 wherein the hindered amine light stabilizer is prepared by reacting a hindered amine light stabilizer that does not contain an aminoether group with a peracid so as to provide the hindered amine light stabilizer with at least one aminoether group.

21. The process of claim 13 wherein the acrylic resin is prepared from monomers comprised of at least one glycidyl compound.

22. The process of claim 21 wherein the glycidyl compound is selected from the group consisting of glycidyl acrylate, glycidyl methacrylate and mixtures thereof.

23. The process of claim 13 wherein the acrylic resin is prepared from monomers comprised of at least one styrene compound.

24. The process of claim 23 wherein the styrene compound is styrene.

25. The process of claim 13 wherein the composition is formed into the powder coating composition by mixing the composition with additives including at least one hindered amine light stabilizer.

* * * * *